United States Patent [19]

Inoue et al.

[11] Patent Number: 4,683,126

[45] Date of Patent: Jul. 28, 1987

[54] METHOD FOR PRODUCING ALKALINE EARTH METAL BORATE DISPERSIONS

[75] Inventors: Kiyoshi Inoue, Hiratsuka; Yoshiharu Nose, Yokosuka, both of Japan

[73] Assignee: Nippon Oil Co., Ltd., Tokyo, Japan

[21] Appl. No.: 834,619

[22] Filed: Feb. 28, 1986

[30] Foreign Application Priority Data

Mar. 8, 1985 [JP] Japan .................................. 60-46252

[51] Int. Cl.$^4$ ........................ C01B 15/12; C01B 35/12
[52] U.S. Cl. ...................................... 423/280; 252/18; 252/33.4; 423/279
[58] Field of Search .................. 423/280, 279; 252/18, 252/33.4

[56] References Cited

U.S. PATENT DOCUMENTS

| | | | |
|---|---|---|---|
| 2,987,476 | 6/1981 | Hartly | 252/18 |
| 3,313,727 | 4/1967 | Peeler | 252/33.4 |
| 3,480,548 | 11/1969 | Hellmuth et al. | 252/33.4 |
| 3,679,584 | 7/1972 | Hellmuth | 252/33.4 |
| 3,829,381 | 8/1974 | LeSuer | 252/33.4 |
| 3,907,691 | 9/1975 | King et al. | 252/18 |
| 3,912,643 | 10/1975 | Adams | 252/18 |

*Primary Examiner*—John Doll
*Assistant Examiner*—Lori S. Freeman
*Attorney, Agent, or Firm*—Bucknam and Archer

[57] ABSTRACT

A method for producing an alkaline earth metal borate dispersion, comprising two steps of:
(I) reacting at 20°–100° C. a mixture of the following ingredients (A) to (E)
  (A) 100 parts by weight of the oil-soluble neutral sulfonate of an alkaline earth metal,
  (B) 10–100 parts by weight of the hydroxide or oxide of an alkaline earth metal,
  (C) boric acid in an amount which is 0.5–6.5 times in mol that of the ingredient (B),
  (D) 5–50 parts by weight of water, and
  (E) 50–200 parts by weight of a dilution solvent and then
(II) heating the reslting reaction mixture to 100°–200° C. to remove the water and a part of the dilution solvent as required.

19 Claims, No Drawings

METHOD FOR PRODUCING ALKALINE EARTH METAL BORATE DISPERSIONS

BACKGROUND OF THE INVENTION

1. Field of the Invention

This invention relates to a method for producing a dispersion of borates of alkaline earth metals, and more particularly to a method for producing an alkaline earth metal borate dispersion in which extremely fine particles of the borate are uniformly dispersed.

2. Prior Art

Borates of alkaline earth metals have cleaning and dispersing performances, acid neutralizing performance, extreme pressure performance, anti-friction and anti-wear performances, corrosion preventing performance, and rust preventing performance, and are expected as a multi-functional additive for fuel oils and lubricating oils. Further, in the field of rust preventing paints, borates of alkaline earth metals are considered to be very promising as a rust preventing agent for non-pollutional rust preventing pigments, which agent replaces lead or chromium type rust preventing pigments.

However, when borates of alkaline earth metals are used as additives for fuel oils, lubricating oils or rust preventives, if the borates of alkaline earth metals are used in a powdered form, they are not well be dispersed but precipitate in the fuel oils, lubricating oils or solvents thereby failing to exhibit their properties because of their unduly large particle size and, furthermore, they are likely to cause friction and the like within the system. Therefore, when borates of alkaline earth metals are used as additives, they are required to be used in such a dispersion form that they are uniformly dispersed in an extremely fine particulate form without the precipitation in a dilution solvent.

As a method for producing such a dispersion of borates of alkaline earth metals, U.S. Pat. No. 3,679,584 discloses a method which comprises heating and reacting an alkaline earth metal carbonate overbased alkaline earth metal sulfonate (this term being defined in column 2, lines 9-14 of the above Patent), boric acid and an alkaline earth metal hydroxide in a mineral oil or a dilution solvent while blowing carbon dioxide gas thereinto, and U.S. Pat. No. 3,829,381 discloses a method which comprises reacting calcium carbonate overbased petroleum calcium sulfonate with boric acid in a mineral oil.

However, the dispersions of alkaline earth metal borate dispersions obtained by these methods have a low molar ratio of boron to alkaline earth metal in the entire dispersions, and also have insufficient extreme pressure performance and corrosion preventing performance. Also, since the compositions, that is, the dispersions contain the alkaline earth metal carbonate, e.g. calcium carbonate, the particles of the carbonate of alkaline earth metal increase in size as the dispersion takes a longer time to be used, and the total base number measured by the hydrochloric acid method is lower than that measured by the perchlorate method.

As a similar alkaline earth metal borate dispersion, Japanese Patent Laid-Open Gazette No. 39702/76 discloses a method for producing a mixture of an alkali metal borate dispersion and an alkaline earth metal borate dispersion. In this method, neutral sulfonate of an alkali or alkaline earth metal is allowed to react with an alkaline earth metal base and carbon dioxide gas in an inactive hydrocarbon solvent to form an overbased sulfonate, which is then contacted with 2-6 parts in mol of boric acid per 1 part in mol of an alkaline earth metal carbonate which is present as the overbased alkali or alkaline earth metal sulfonate, in an inactive oleophilic reaction medium to form an alkaline earth metal borate dispersion which is then contacted with an alkali metal base.

However, the above-mentioned method of producing a dispersion of an alkaline earth metal borate requires two reaction steps, in which a neutral sulfonate is first overbased and then allowed to react with boric acid. In addition, this method has a problem that it is impossible in the second step to freely control the calcium borate content in the thus formed dispersion of alkaline earth metal borate and that said content is limited by the content of alkaline earth metal carbonate in the overbased sulfonate produced in the first step of the reaction process.

As described above, prior art methods for producing a dispersion of alkaline earth metal borates are disadvantageous in the performance of alkaline earth metal borate dispersion obtained or in their reaction steps. The inventors of this invention made various studies in attempt to find an excellent method for producing a dispersion of alkaline earth metal borates and, as a result of their studies, found that a dispersion of alkaline earth metal borates having excellent performance can be obtained by a specific producing method. This invention is based on this finding.

OBJECT OF THE INVENTION

It is an object of this invention to provide a very simple method for producing an alkaline earth metal borate dispersion containing the borate in an extremely fine particulate form and having a high boron/alkaline earth metal molar ratio, excellent cleaning and dispersing performances, extreme pressure performance, anti-friction and anti-wear performances, corrosion preventing performance and rust preventing performance, which method requires only one reaction step for obtaining the dispersion.

DESCRIPTION OF THE INVENTION

This invention provides a method for producing a dispersion of alkaline earth metal borates, comprising two steps of:

[I] reacting at 20° to 100° C. a mixture of the following materials (A) to (E)
  (A) 100 parts by weight of an oil-soluble neutral sulfonate of an alkaline earth metal,
  (B) 10-100 parts by weight of a hydroxide or an oxide of an alkaline earth metal,
  (C) 0.5-6.5 times in mol of ingredient (B) of boric acid,
  (D) 5-50 parts by weight of water, and
  (E) 50-200 parts by weight of a dilution solvent to obtain a reaction mixture, and

[II] heating the thus obtained mixture to 100°-200° C. to remove the water and, if necessary, a part of the dilution solvent The method of this invention will be described in more detail below.

The ingredient (A) used in the step [I] of this invention (hereinafter called the reaction step) is an oil-soluble neutral sulfonate (normal salt) of an alkaline earth metal, and an alkaline earth metal salt of an alkyl aromatic sulfonic acid having a molecular weight of about 300 to 700 can be used as the ingredient (A).

The alkyl aromatic sulfonic acids include petroleum sulfonic acid or synthetic sulfonic acids. The petroleum sulfonic acids used herein can be obtained by the sulfonation alkyl aromatic compounds in the lubricant oil fraction of a mineral oil. The synthetic sulfonic acids include those produced by sulfonating alkyl benzenes having 1 or 2 straight or branched alkyl groups obtained as a by-product of a detergent manufacturing plant or by the alkylation of benzene with a polyolefin, and also include sulfonated alkyl naphthalenes such as sulfonated dinonyl naphthalene.

The alkaline earth metals used herein include magnesium, calcium and barium.

The neutral sulfonate of an alkaline earth metal means a chemical equivalent salt of the above alkyl aromatic sulfonic acid and the alkaline earth metal, and is obtained, for example, by the direct reaction of an alkyl aromatic sulfonic acid and an aqueous hydroxide of an alkaline earth metal, or by reacting an alkyl aromatic sulfonic acid with an aqueous hydroxide of an alkaline earth metal to form an alkaline earth metal sulfonate and then contacting the thus formed sulfonate with a salt, e.g. halide, of an alkaline earth metal under heat.

The neutral sulfonate of an alkaline earth metal, which is the ingredient (A), may be those marketed under tradenames of Surchem 301 (Surpass Co.), Ca6945 (Kimes Co.), NA-SUL-729 (Vanderbilt Co.), PETRONATE 25C (WITCO), Moresco Amber-SC-45N (Matsumura Sekiyu), Sulfol Ca 45N (Matsumura Sekiyu), and the like.

The neutral sulfonate of an alkaline earth metal, as the ingredient (A), is available in solutions in mineral oils. In this invention, however, the weight of ingredient (A) is shown as the weight of the neutral sulfonate of an alkaline earth metal alone because the mineral oil used as a solvent is included in the dilution solvent as the ingredient (E).

The ingredient (B) in the reaction step of this invention is a hydroxide or oxide of an alkaline earth metal, e.g. magnesium hydroxide, calcium hydroxide, barium hydroxide, magnesium oxide, calcium oxide and barium oxide. The alkaline earth metal contained in the ingredient (B) may be the same as, or different from, that contained in the ingredient (A).

The quantity of the ingredient (B) used in the reaction step is 10-100 parts by weight, preferably 20-50 parts by weight, per 100 parts by weight of the ingredient (A). If the quantity of the ingredient (B) used is less than 10 parts by weight, the effective base value of the resulting alkaline earth metal borate formed will be low, and the anti-friction and anti-wear performance of the resulting borate will become poor; if the quantity of the ingredient (B) used exceeds 100 parts by weight, the ingredient (B) will not be dispersed evenly in the dilution solvent as the ingredient (E) with the result that the particle size of the resulting borate of an alkaline earth metal is undesirably increased.

The ingredient (C) in the reaction step of this invention is boric acid. The quantity (in mol) of the ingredient (C) used in the reaction step is 0.5-6.5 times, preferably 1.0-6.0 times, that (in mol) of the ingredient (B). By varying the quantity of the ingredient (C) used within the above range, alkaline earth metal borates having varous alkaline earth metal/boron compositional ratios can be obtained. If the quantity in mol of the ingredient (C) used is less than 0.5 times, the alkaline earth metal hydroxide as the ingredient (B) will partly remain unreacted; if the quantity in mol of the ingredient (C) used exceeds 6.5 times, the boric acid as the ingredient (C) will undesirably partly remain unreacted.

The ingredient (D) in the reaction step of this invention is water. By mixing the ingredient (D) in the reaction step, the resulting alkaline earth metal borate can be obtained in an extremely fine particulate form, thereby enabling the thus obtained particles to be dispersed evenly in the dilution solvent. The quantity of the ingredient (D) used in the reaction step is 5-50 parts by weight, preferably 15-40 parts by weight, per 100 parts by weight of the ingredient (A). If the ingredient (D) is not added, a large quantity of starting materials will remain unreacted, and coarse large-sized particles will be present in the reaction mixture; if the quantity of ingredient (D) used exceeds 50 parts by weight, an alkaline earth metal borate will be produced in a coarse and large particulate form, and a long time is required for the dehydration step to be described below. If the quantity of the ingredient (D) used is less than 5 parts by weight, the reactivity of the ingredients (A) to (C) will be lowered, and the reaction time will undesirably be much lengthened.

The ingredient (E) in the reaction step of this invention is a dilution solvent, and it may usually be a nonpolar organic solvent having a boiling point of 60° C. or higher. The ingredient (E) includes aromatic hydrocarbons such as benzene, toluene and xylene, petroleum solvents such as benzine, ligroin, mineral spirit, cleaning solvent and Stoddard solvent, and gasoline, kerosene, light oil and lubricant oil fractions of a mineral oil. As described above, the ingredient (E) also includes a mineral oil used as a dispersion medium for neutral salts of an alkaline earth metal, which are the ingredient (A).

The quantity of ingredient (E) used in the reaction step of this invention is 50-200 parts by weight, preferably 100-150 parts by weight, per 100 parts by weight of the ingredient (A). If the quantity of ingredient (E) mixed is less than 50 parts by weight, the resulting dispersion of the alkaline earth metal borate will be much increased in viscosity, if the quantity of ingredient (E) mixed exceeds 200 parts by weight, the effective ingredients will be descreased in concentration.

Although the dilution solvent as the ingredient (E) is originally used in the form of a mixture with the ingredient (A) as the dispersing medium for the ingredient (A), it may be further mixed with a dilution solvent which is the same as or different from said dispersing medium during the reaction step as required.

In the reaction step of this invention, the prescribed quantities of the above ingredients (A) to (E) are mixed and then reacted with thorough stirring at a reaction temperature of 20°-100° C., preferably 70°-95° C. According to this invention, the reaction may be well conducted within the above reaction temperature range under an atmospheric pressure. Although the reaction time can be selected optionally, it is normally 2-8 hours and preferably 3-5 hours.

The reaction mixture thus obtained is then treated in the step [II] (hereinafter called the dehydration step). The reaction mixture is heated to 100°-200° C., preferably 110°-150° C. with continuous stirring and maintained at this temperature normally for 1-2 hours to remove the water out of the system. By this dehydration step, the water, which is the ingredient (D), mixed during the reaction step and the water produced during reaction step are removed and, at the same time, the quantity of water for the hydration of the resulting alkaline earth metal borate can be adjusted.

In this dehydration step, a part of the dilution solvent, which is the ingredient (E), may also be removed as required. The necessity of solvent removal depends on the use of the resulting dispersion of alkaline earth metal borate obtained by the method of this invention. That is, when the dispersion is to be used as an additive for fuel oils or lubricant oils, it is preferable to remove a part of the dilution solvent during the dehydration step to obtain the dispersion in a concentrated form, while when the dispersion is to be used as a solvent dilution type rust preventing agent, it is not necessary to remove the dilution solvent during the dehydration step.

Although the alkaline earth metal borate dispersion can be obtained by the above reaction and dehydration steps, the dispersion may further be refined by removing the unreacted materials by suitable means such as filtration as required.

According to this invention, as described above, an alkaline earth metal borate dispersion having excellent performance can be obtained by the very simple one-step reaction step.

The alkaline earth metal borate dispersion obtained by the method of this invention usually contains 5-30 percent by weight of an alkaline earth metal borate (containing hydration water). This content can be changed freely by changing mixing ratios of (B) an alkaline earth metal hydroxide or oxide and (C) boric acid to (A) a neutral sulfonate of an alkaline earth metal in the reaction step, or by removing a part of (E) a dilution solvent in the dehydration step.

It has been found that this alkaline earth metal borate dispersion has a boron/alkaline earth metal molar ratio of as high as about 0.8-6 when measured by compositional analysis of the entire dispersion. This boron is derived from the ingredient (C) of this invention, while the alkaline earth metal is derived from the ingredient (A) and ingredient (B). To obtain an alkaline earth metal borate dispersion having such a high boron/alkaline earth metal molar ratio is one of the features of this invention.

The alkaline earth metal borate obtained according to this invention has the following composition:

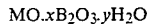

$MO.xB_2O_3.yH_2O$ (wherein M represents an alkaline earth metal, x represents a positive number between 0.5 and 3.0, and y represents a positive number between 1.0 and 5.0).

The value of x in the above formula is roughly determined by the mixing ratio of ingredient (B) to ingredient (C) in the reaction step of this invention. In the reaction step, when the molar ratio of the ingredient (C)/ingredient (B) is about 2x, an alkaline earth metal borate having an $MO/B_2O_3$ ratio of x can be obtained as the main component. On the other hand, the value of y can be changed by changing the temperature and time for water removal in the dehydration step.

The particle size of the alkaline earth metal borate obtained by the method of this invention is 1,000 Å or less, normally 500 Å or less, and preferably 200 Å or less. To obtain extremely fine particles of alkaline earth metal borates is also one of the features of this invention.

Since the alkaline earth metal borate dispersion obtained by the method of this invention has excellent cleaning and dispersing performances, extreme pressure performance, anti-friction and anti-wear performances, corrosion preventing performance and rust preventing performance, it can suitably be used, as it is or after diluted with an appropriate solvent, as an additive for petroleum products such as fuel oils and lubricating oils, or as a rust preventing additive for corrosion preventive paints.

PREFERRED EMBODIMENTS OF THE INVENTION

This invention will more fully be described referring to the following examples.

EXAMPLE 1

One hundred parts by weight of synthetic neutral calcium sulfonate (dissolved in 100 parts by weight of a lubricating oil fraction), 32 parts by weight of calcium hydroxide, 53.6 parts by weight of boric acid (2.0 times that (in mol) of the calcium hydroxide), 20 parts by weight of water, and 20 parts by weight of cleaning solvent having a boiling point range of 150°–175° C., were mixed and reacted with thorough stirring under an atmospheric pressure at a reaction temperature of 85° C. for 4 hours. The resulting reaction mixture was then heated to elevate the temperature of the system to 120° C. and maintained at this temperature with stirring for 1 hour, thereby to remove the water and a part of the solvent, i.e. cleaning solvent, out of the system.

The reaction mixture was then filtered out to obtain a dispersion of calcium borate as the filtrate.

This calcium borate dispersion contained 24% by weight of calcium borate (including hydration water), and the entire dispersion had the following analysis:
Ca: 7.7% by weight,
S: 1.6% by weight,
B: 3.8% by weight,
B/Ca: 1.83 (molar ratio).
Total base value:
 (hydrochloric acid method); 180,
 (perchlorate method): 175.

The total base number was measured in accordance with JIS K2501 5.2.2 "Potential Difference Titration Method" (hydrochloric acid method) and JIS K2501 5.2.3 "Potential Difference Titration Method" (perchlorate method). The calcium borate in this calcium borate dispersion had an average composition of $CaO.B_2O_3.2H_2O$ and an average particle size of 100–200 Å.

EXAMPLE 2

One hundred parts by weight of synthetic neutral calcium sulfonate (dissolved in 100 parts by weight of lubricating oil fraction), 19 parts by weight of calcium oxide, 62 parts by weight of boric acid (3.0 times in mol the amount of the calcium oxide), 26 parts by weight of water and 40 parts by weight of cleaning solvent having a boiling point range of 150° to 170° C., were mixed and reacted with stirring under an atmospheric pressure at a reaction temperature of 80° C. for 4.5 hours. The resulting reaction mixture was then heated to 130° C. and stirred continuously at this temperature for 1 hour to remove from the system the water and the cleaning solvent which was part of the dilution solvent.

Next, the reaction mixture so treated was filtered out to obtain a dispersion of calcium borate.

The calcium borate dispersion contained 25% by weight of calcium borate (including hydration water) and had the following analysis:
Ca: 6.2% by weight,
S: 1.7% by weight, B: 4.0% by weight,
B/Ca: 2.34 (molar ratio).
Total base number:
(hydrochloric acid method): 138,
(perchlorate method): 144.

The total base numbers were measured in the same manner as in Example 1.

The calcium borate in this calcium borate dispersion had an average composition of $2CaO.3B_2O_3.5H_2O$ and an average particle size of 300–400 Å.

COMPARATIVE EXAMPLE 1

A dispersion of calcium borate was produced in the same manner as in Example 1 except for the addition of water.

The reaction mixture obtained by this production method was found to contain a large amount of the unreacted materials and coarse large particles, and the filtrate obtained by filtering the above mixture as in Example 1 had the following analysis:
Ca: 1.6% by weight,
S: 2.0% by weight,
B: 0.1% by weight or less.

From this result, it is seen that a dispersion of calcium borate cannot be produced without adding water.

EXAMPLE 3 AND COMPARATIVE EXAMPLES 2 AND 3

The following experiment was carried out to demonstrate the rust preventing performance of a dispersion of an alkaline earth metal obtained by the method of this invention.

A solvent dilution type rust preventing composition was produced by adding 50 parts by weight of microwax (melting point: 82° C.), 50 parts by weight of a lanolin derivative, and 200 parts by weight of mineral spirit (boiling point: 150°–200° C.) used as a solvent, to 135 parts by weight of the calcium borate dispersion produced in Example 1.

The salt spray test shown below was conducted on this composition, and the results shown in Table 1 were obtained.

SALT SPRAY TEST

A dull steel plate measuring 75 × 150 mm was coated with the composition and used as the test piece, and the test was conducted when the dried film thickness was 105 ± 15 μm in accordance with JIS K 2246. Numerical values shown in Table 1 indicate the times (hours) between the spraying and the rust formation.

For comparison, the procedure of Example 3 was followed except that calcium sulfonate neutral salt, which was known as an effective rust preventing agent, was substituted for the calcium borate dispersion to obtain a comparative sample (Comparative Example 2), and the thus obtained sample had barium borate (particle size: 1–3 μm) (particle size: 1–3 μm) dispersed therein by the use of a sand mill, the barium borate being excellent in rust preventing performance among borate-type rust preventing pigments, to obtain another comparative sample (Comparative Example 3). The two comparative samples were subjected to the same salt test as in Example 1. The results of the test and the compositions of rust preventing agents are also shown in Table 1.

EXAMPLES 4 AND 5, AND COMPARATIVE EXAMPLES 4 AND 5

The following experiment was conducted to demonstrate the anti-friction and anti-wear performances of an alkaline earth metal borate dispersion obtained by the method of this invention.

Lubricating oil compositions were obtained by adding the calcium borate dispersion produced in Example 2 in the amount shown in Table 2 to white oil having a viscosity of 40 cst at 40° C. (Examples 4 and 5).

These compositions were subjected to the FALEX friction and wear test under the conditions of a load of 200 lbs, a test time of 60 minutes and an oil quantity of 50 ml. The amount (mg) of the pin worn are shown in Table 2.

For comparison, the base oil alone (Comparative Example 4) and the base oil to which neutral calcium sulfonate was added in place of the calcium borate dispersion (Comparative Example 5) were subjected to the FALEX friction and wear test under the same test conditions. The results are also shown in Table 2.

TABLE 1

|  | Example 3 | Comparative Example 2 | Comparative Example 3 |
|---|---|---|---|
| Composition (parts by weight) | | | |
| Calcium borate dispersion*(1) | 100 | — | — |
| Neutral calcium sulfonate*(2) | — | 100 | 100 |
| Barium borate (particle size: 1–3 μm) | — | — | 40 |
| Microwax (melting point: 82° C.) | 50 | 50 | 50 |
| Lanolin derivative | 50 | 50 | 50 |
| Mineral spirit (boiling point: 150–200° C.) | 200 | 200 | 200 |
| Salt spray test (hours taken before rust formation) | >4,000 | 1,500 | 2,000 |

*(1)Produced in Example 1
*(2)Used in Example 1 (contained 50% by weight of lubricating oil fraction)

TABLE 2

|  | Example 4 | Example 5 | Comparative Example 4 | Comparative Example 5 |
|---|---|---|---|---|
| Composition (Parts by weight) | | | | |
| Calcium borate dispersion*1 | 1 | 3 | — | — |
| Neutral calcium sulfonate*2 | — | — | — | 3 |
| White oil (40 cst, at 40° C.) | 99 | 97 | 100 | 97 |
| FALEX test (wear of pin, mg) | 4.0 | 1.3 | Seized | 40.3 |

*1Produced in Example 2
*2Used in Example 2 (contained 50% by weight of lubricating oil fraction)

EFFECT OF THE INVENTION

According to this invention, as is seen from the results of Examples 1 and 2, alkaline earth metal borate dispersions having extremely fine particles and a high boron/alkaline earth metal molar ratio can be obtained by a very simple method which requires only a one-step reaction step.

However, the reaction mixture obtained by the method of Comparative Example 1 in which water, which is the ingredient (D) of this invention, is not added, is known to contain a large quantity of the unreacted materials and large particles, and the filtrate obtained by filtering the reaction mixture is known to contain little calcium borate.

As seen from the results of Examples 3 to 5, the alkaline earth metal borate dispersions obtained by the method of this invention have very excellent rust preventing performance and anti-friction and anti-wear performance. This proves there are clear differences in performances between cases wherein the dispersion of this invention is added and those wherein it is not added.

Furthermore, the alkaline earth metal borate dispersions obtained by the method of this invention have excellent cleaning and dispersing performance, extreme pressure performance and corrosion preventing performance, and can be used effectively for various purposes such as an additive for petroleum products such as fuel oils and lubricants, or as a rust preventing agent for corrosion preventive paints.

What is claimed is:

1. A method for producing an alkaline earth metal borate dispersion, consisting of two steps of:
   (I) reacting at 20°–100° C. a mixture of the following ingredients (A) to (E)
      (A) 100 parts by weight of the oil-soluble neutral sulfonate of an alkaline earth metal,
      (B) 10–100 parts by weight of the hydroxide or oxide of an alkaline earth metal,
      (C) boric acid in an amount which is 0.5–6.5 times in mol that of the ingredient (B),
      (D) 5–50 parts by weight of water and
      (E) 50–200 parts by weight of a dilution solvent
   and then
   (II) heating the resulting reaction mixture to 100°–200° C. to remove the water.

2. A method according to claim 1, wherein the oil-soluble neutral sulfonate of an alkaline earth metal is an alkaline earth metal salt of an alkyl aromatic sulfonic acid having a molecular weight of 300 to 700.

3. A method according to claim 2, wherein the alkyl aromatic sulfonic acid is a petroleum sulfonic acid or a synthetic sulfonic acid.

4. A method according to claim 1, wherein the alkaline earth metal in the ingredient (A) is magnesium, calcium or barium.

5. A method according to claim 1, wherein the oil-soluble neutral sulfonate of an alkaline earth metal is obtained by the direct reaction of an alkyl aromatic sulfonic acid with the hydroxide of an alkaline earth metal.

6. A method according to claim 1, wherein the oil-soluble neutral sulfonate of an alkaline earth metal is obtained by reacting an alkyl aromatic sulfonic acid with the hydroxide of an alkaline earth metal to form an alkaline earth metal sulfonate and then contacting the thus formed sulfonate with a halide of an alkaline earth metal under heat.

7. A method according to claim 1, wherein the hydroxide of an alkaline earth metal is magnesium hydroxide, calcium hydroxide or barium hydroxide.

8. A method according to claim 1, wherein the oxide of an alkaline earth metal is magnesium oxide, calcium oxide or barium oxide.

9. A method according to claim 1, boric acid is contained in an amount which is 1.0–6.0 times in mol that of the ingredient (B).

10. A method according to claim 1, wherein the dilution solvent is an aromatic hydrocarbon selected from the group consisting of benzene, toluene and xylene.

11. A method according to claim 1, wherein the dilution solvent is a petroleum solvent selected from the group consisting of benzene, ligroin, mineral spirit, cleaning solvent and Stoddard solvent.

12. A method according to claim 1, wherein the dilution solvent is a member selected from the group consisting of gasoline, kerosene, light oil and lubricant oil fractions of a mineral oil.

13. A method according to claim 1, wherein the alkaline earth metal borate dispersion contains 5–30 percent by weight of an alkaline earth metal borate containing hydration water.

14. A method according to claim 1, wherein the alkaline earth metal borate dispersion has a boron/alkaline earth metal molar ratio of about 0.8–6 when measured by compositional analysis of the entire dispersion.

15. a method according to claim 1, wherein the alkaline earth metal borate has the following composition:

$$MO.xB_2O_3.yH_2O$$

wherein M represents an alkaline earth metal, x represents a positive number between 0.5 and 3.0, and y represents a positive number between 1.0 and 5.0.

16. A method according to claim 1, wherein the particle size of the alkaline earth metal borate is 1,000 Å or less.

17. A method according to claim 1, wherein the particle size of the alkaline earth metal borate is 500 Å or less.

18. A method according to claim 1, wherein the particle size of the alkaline earth metal borate is 200 Å or less.

19. The method according to claim 1, wherein in said step (II) the resulting reaction mixture is heated to 100°–200° C. to remove the water and such a part of the dilution solvent as to obtain a dispersion in a concentrated form suitable for use as an additive for fuel oils or lubricant oils.

* * * * *